United States Patent [19]

Tillemans

[11] Patent Number: 5,613,811
[45] Date of Patent: Mar. 25, 1997

[54] DUST-FREE METHOD AND APPARATUS FOR LOCATING AND CUTTING HOLES FOR ELECTRICAL OUTLET BOXES, RECESSED LIGHT FIXTURES AND THE LIKE

[76] Inventor: Gregory M. Tillemans, 1612 W. 22nd St., No. 104, Wichita, Kans. 67204

[21] Appl. No.: 421,498

[22] Filed: Apr. 13, 1995

[51] Int. Cl.$^6$ .................... B23C 1/20; B27C 5/10
[52] U.S. Cl. .............. 409/130; 33/562; 33/DIG. 10; 83/745; 144/144.51; 144/252.1; 144/372; 409/137; 409/178; 451/237
[58] Field of Search .............. 33/528, 562, DIG. 2, 33/DIG. 10; 409/131, 132, 137, 178, 179, 181, 182, 125, 130; 144/144 R, 144.5 R, 252 R, 372; 83/565, 745; 451/237, 281

[56] References Cited

U.S. PATENT DOCUMENTS

| D. 298,421 | 11/1988 | Tyroff | D10/69 |
|---|---|---|---|
| D. 317,416 | 6/1991 | Biglin | D10/64 |
| 3,823,754 | 7/1974 | Nix | 33/528 |
| 4,202,388 | 5/1980 | Wieting | 33/528 |
| 4,674,548 | 6/1987 | Mills et al. | 409/182 |
| 4,793,069 | 12/1988 | McDowell | 33/528 |
| 5,038,551 | 8/1991 | Burdick | 83/565 |
| 5,040,304 | 2/1991 | Jackson | 33/528 |
| 5,110,239 | 5/1992 | Riley et al. | 409/125 |
| 5,111,593 | 5/1992 | Gehen | 33/613 |
| 5,114,285 | 5/1992 | Brydon | 408/72 R |
| 5,168,636 | 12/1992 | Golden | 33/562 |

*Primary Examiner*—Steven C. Bishop
*Attorney, Agent, or Firm*—Hovey, Williams, Timmons & Collins

[57] ABSTRACT

A vacuum template has a suction chamber on its back surface that adheres the template to the wall or other flat surface when a source of vacuum pressure attached to the template is turned on and the template has been placed by the worker in its desired position. Dust inlets adjacent a guidance hole in the template immediately suction away dust particles as the hole is being cut by a power tool or hand saw manipulated by the user. Interchangeable modules on the template provide for variations in hole size and shape.

33 Claims, 5 Drawing Sheets

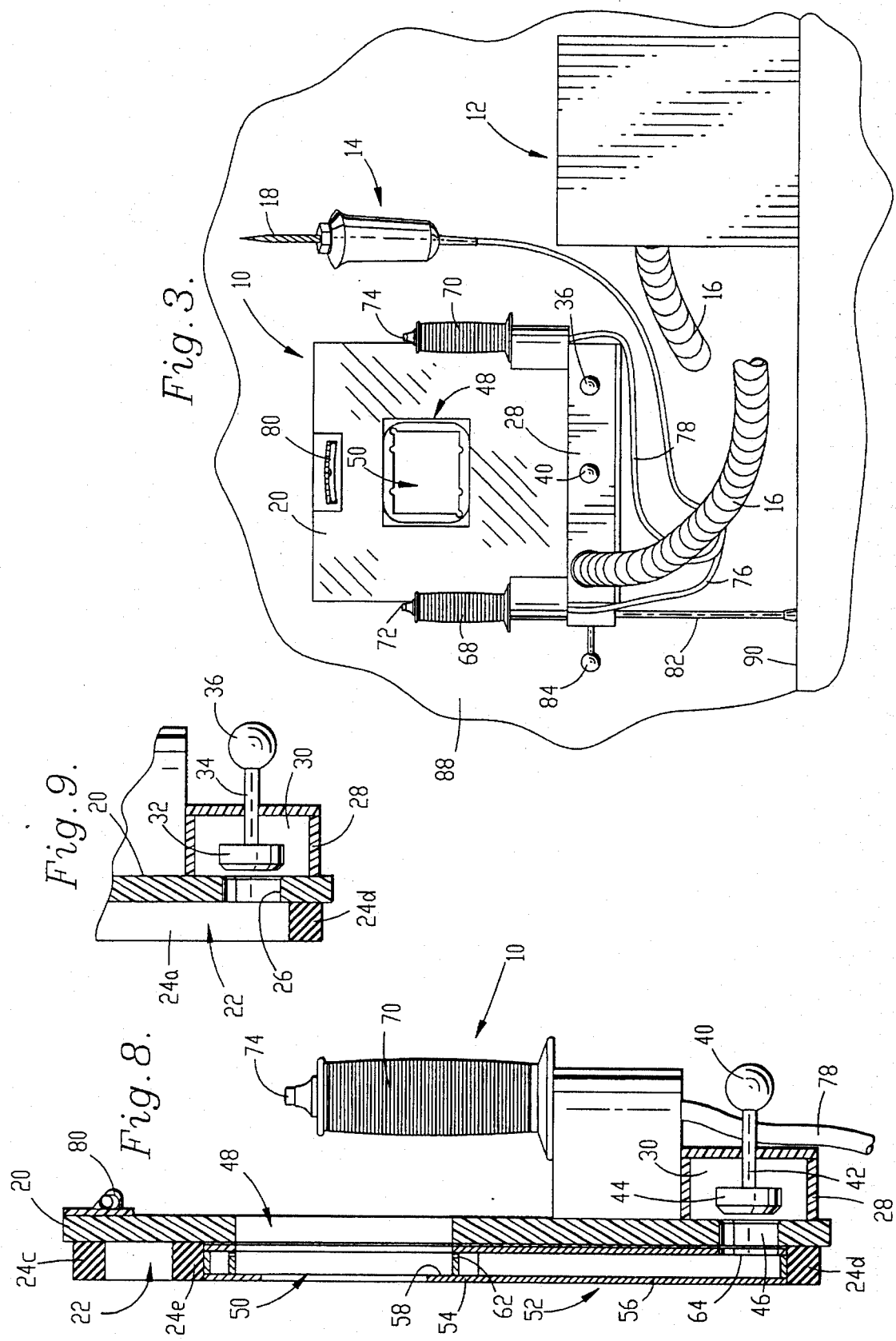

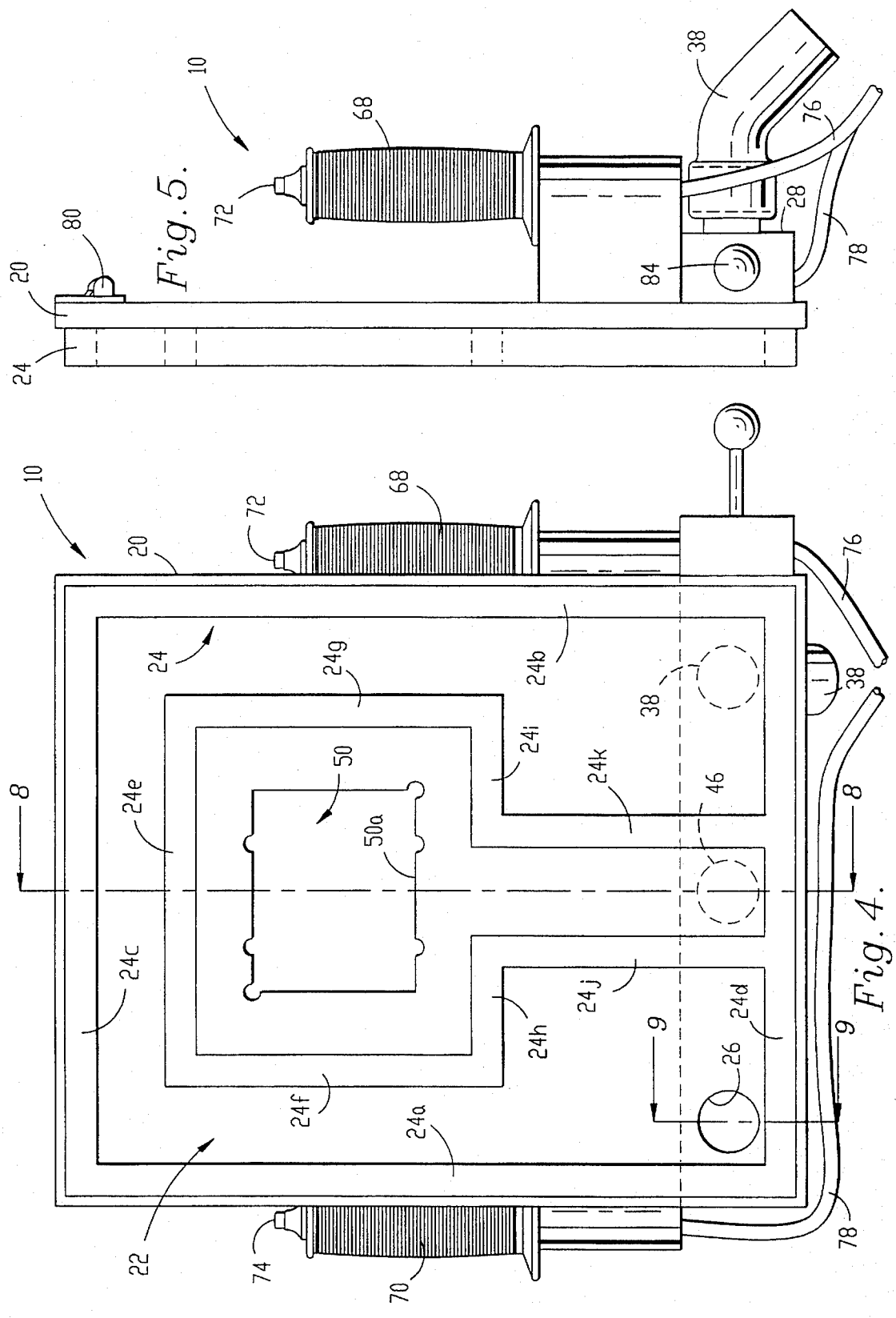

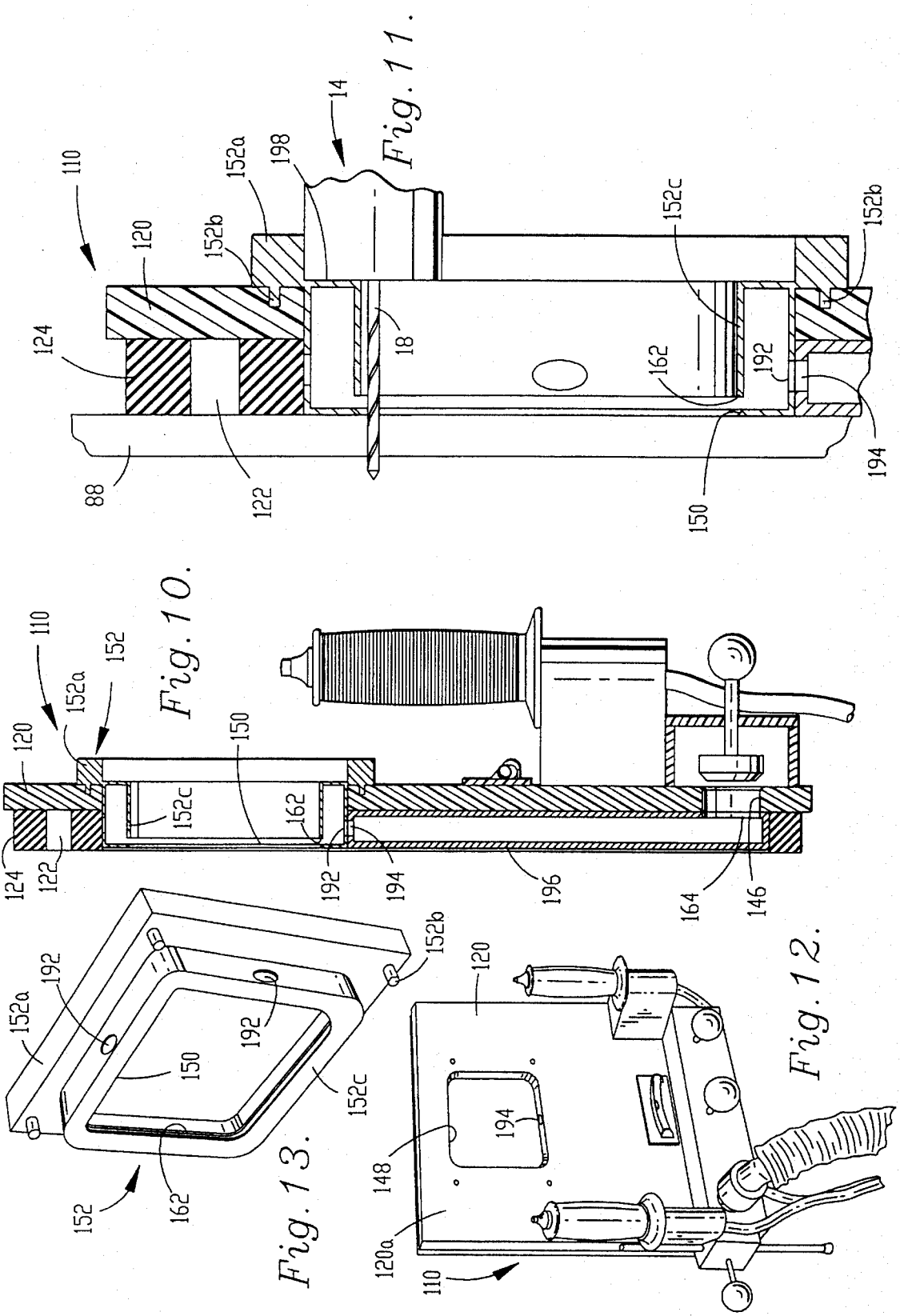

DUST-FREE METHOD AND APPARATUS FOR LOCATING AND CUTTING HOLES FOR ELECTRICAL OUTLET BOXES, RECESSED LIGHT FIXTURES AND THE LIKE

TECHNICAL FIELD

This invention relates to a special template for use by electricians and construction workers in cutting accurately located and precisely shaped holes in walls and ceilings for receiving electrical outlet boxes, recessed light fixtures and the like. More particularly, it relates to a template of the foregoing type which is self-adhering to the wall or other flat surface so as to permit handsfree manipulation of the cutting tool, and which is operable to simultaneously vacuum away dust particles as they are created by the cutting procedure.

BACKGROUND

Electrical contractors frequently need to cut a hole of particular configuration in an existing wall or ceiling of either a finished commercial or residential room space. The hole may be necessary, for example, to receive an electrical outlet box or switch, or in the case of a ceiling light, may be necessary to provide clearance for the housing or box associated with a recessed lighting fixture. Such holes need to be positioned accurately, shaped to correspond closely to the outline of the box involved, prepared speedily so as to not waste time, and carried out with cleanliness and without damage to surrounding furniture, equipment and decor.

However, present techniques for accomplishing this task are relatively crude and largely unsatisfactory. After locating the proper height above the floor in the case of a wall box, for example, the worker then takes the box and traces around its outline with a pencil so that a pattern is drawn on the wall roughly approximating the shape of the hole to be cut. Just before drawing around the perimeter of the box, the worker attempts to level the box using a suitable level indicating tool, which he places aside with his free hand after the box is leveled while simultaneously attempting to hold the box pressed tightly against the wall with his other hand. If the box accidently slips, he must relocate and re-level the box before drawing the outline.

After the shape of the box is finally determined, the worker takes a suitable cutting tool such as a hand saw or power saw and proceeds to cut the hole along the line previously drawn on the wall. Dust and particles from the wallboard fly around during the cutting process and collect on adjacent carpeting, furniture and other items typically found in finished residential and commercial properties. Consequently, after the hole has been completely cut, the worker must then remain at the site and carefully remove all the unsightly dust and residue from the area. If a number of holes are to be cut, which is usually the case, the lengthy procedure is made even more time-consuming and messy, which reduces efficiencies and may strain the relationship between the worker and the home or business owner.

SUMMARY OF THE PRESENT INVENTION

Accordingly, one important object of the present invention is to provide a new template, and technique for using it, that overcomes the problems and inefficiencies associated with conventional methods, enabling the electrician to do a faster and better job in a more efficient and professional manner than heretofore possible. In carrying out the foregoing object, one important aim of the present invention is to provide a template which completely eliminates the preliminary step of drawing an outline around the box for the hole to be cut. Instead, the template is provided with an opening shaped in accordance with the hole to be cut so that the template itself is used as a guide for the cutter as it is manipulated by the worker to prepare the hole.

Still further, the template is made in such a way that it is capable of securely attaching itself to the wall without in any way damaging or marking the wall so that the worker has both hands totally free to manipulate the cutting device he is operating to prepare the hole. There is no need to hold the template with one hand and operate the cutter with the other.

Such self-attachment is accomplished through the use of a suction chamber on the back side of the template that seals against the flat surface when a vacuum is drawn in the chamber through connection with a source of vacuum pressure, such as a standard, household vacuum sweeper. Such vacuum pressure is also present at a series of inlet ports around the guide opening in the template to simultaneously suck up dust and residue particles generated by the cutting procedure, resulting in a continuously neat and tidy work site that is pleasing to all concerned and which makes the overall project go much faster than would otherwise be the case.

These and other important objects will be apparent from the following description.

BRIEF DESCRIPTION OF THE DRAWINGS

FIG. 3 is a fragmentary, front elevational view of the vacuum template illustrating also the source of vacuum pressure to be utilized with the template;

FIG. 4 is a rear elevational view of the template;

FIG. 5 is a left side elevational view thereof;

FIG. 8 is a vertical cross-sectional view of the template taken substantially along line 8—8 of FIG. 4;

FIG. 9 is an enlarged fragmentary cross-sectional view through the template taken substantially along line 9—9 of FIG. 4;

FIG. 10 is a central, vertical cross-sectional view similar to FIG. 8 of a second embodiment of the template utilizing a replaceable module that is inserted from the front side of the template;

FIG. 11 is an enlarged, fragmentary cross-sectional view of the template of FIG. 10 illustrating the manner of use of the template with a power cutting tool;

FIG. 12 is a perspective view of the second embodiment on a reduced scale with the module removed; and FIG. 13 is a perspective view of the removable module used with the second embodiment of the template.

DETAILED DESCRIPTION

Figures 1, 2:
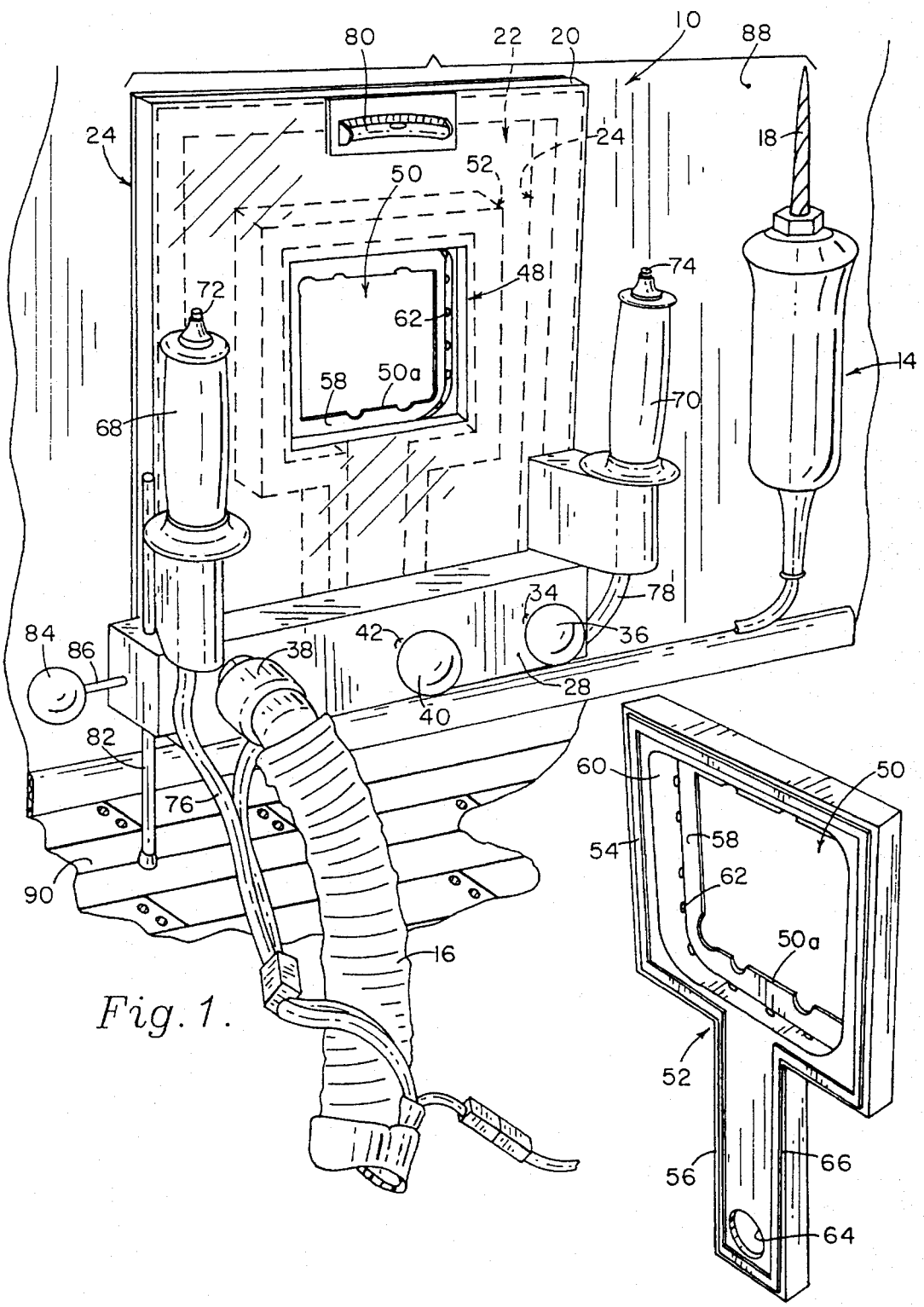
FIG. 1 is a fragmentary perspective view of part of a room space illustrating the manner of using a vacuum template in accordance with the principles of the present invention.
FIG. 2 is an enlarged perspective view of one form of interchangeable module usable with the template so that holes of various selectable shapes may be prepared.
Figure 7:
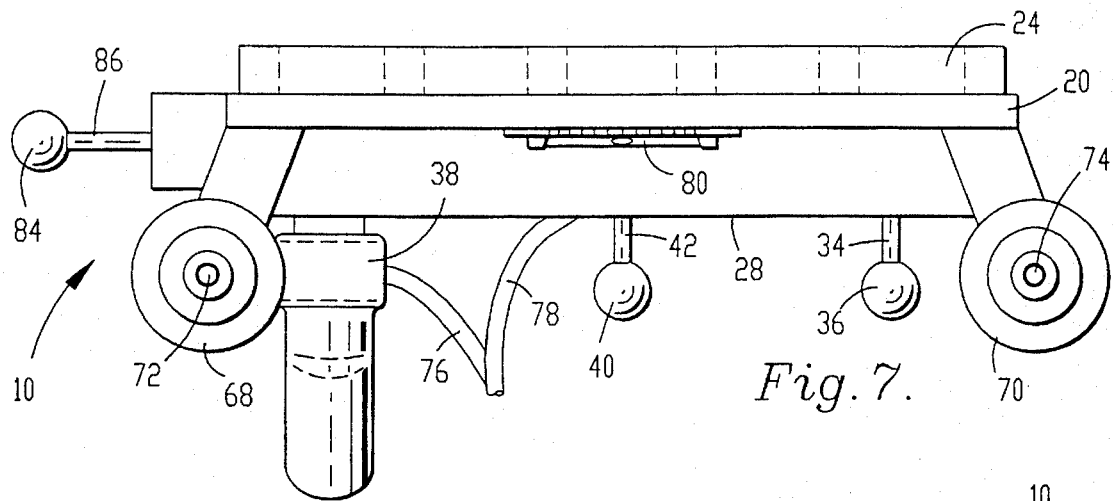
FIG. 7 is a top plan view of the template.
Figure 6:
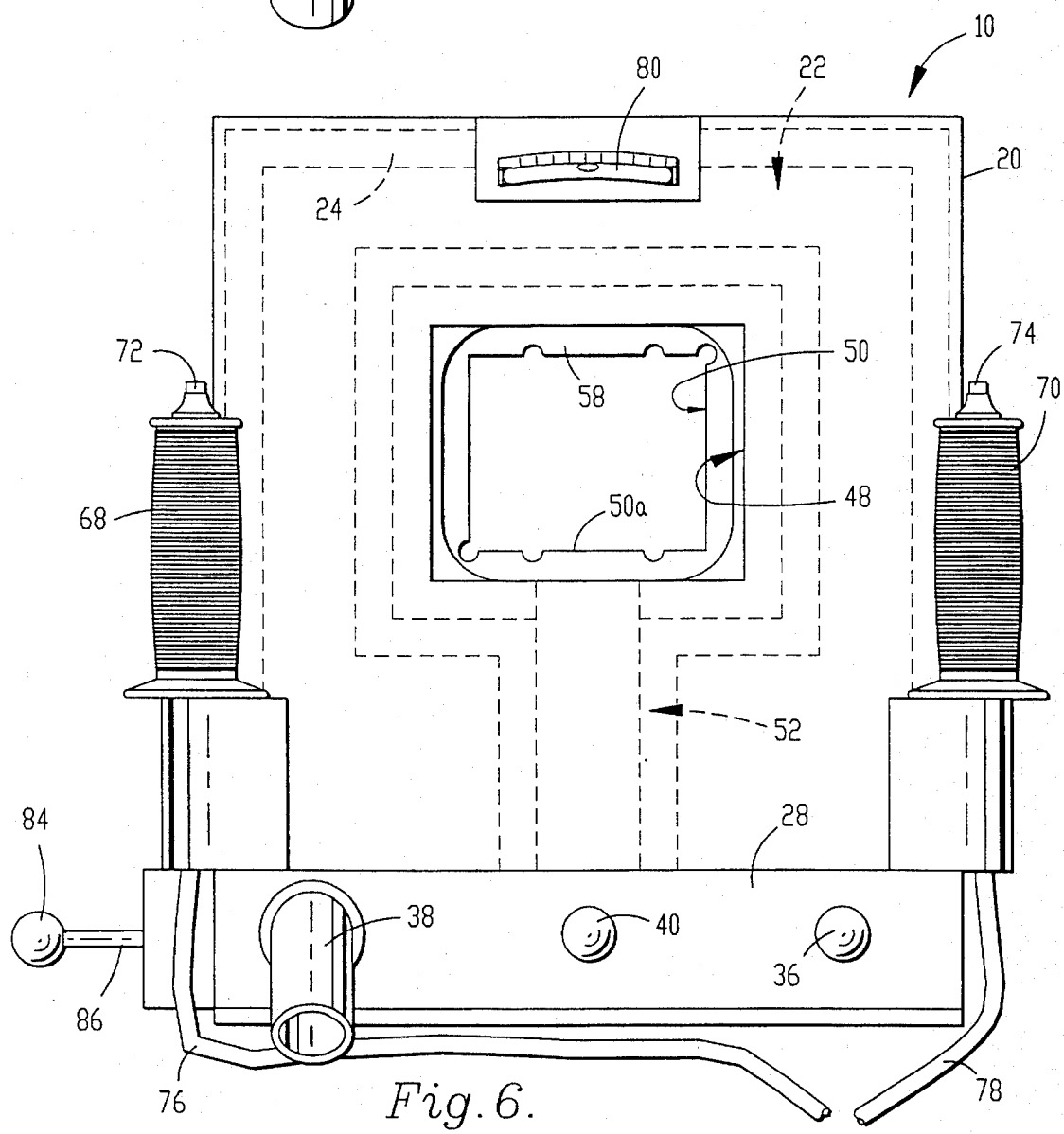
FIG. 6 is a front elevational view of the template.

Referring initially to FIG. 3, it will be seen that the system contemplated by the present invention includes three major components, i.e., the template 10, a source of vacuum pressure 12 coupled with the template 10, and a powered cutting tool 14. The vacuum source 12 may comprise any one of a number of suitable devices capable of generating sufficient vacuum pressure to provide the cleaning action and adhering or attaching action involved in the present invention, as described in more detail below. A hose 16 leads from the vacuum source 12 to the template 10 to supply the vacuum pressure and to carry away particles and other residue from the cutting operation. Turning the vacuum source 12 off and on is controlled by suitable controls associated with the template 10 as will be described below.

The cutting tool 14 may likewise be of any number of different types. Preferably, it is electrically powered and has a high speed rotary bit or blade 18 having a pointed tip that facilitates making an initial puncture in the wall surface at the start of the cutting action. The sharpened periphery of the rotary bit 18 is then used to provide the necessary cutting action of the wallboard.

The template 10 includes as a primary component a transparent, rectangular plate 20 that serves effectively as a frame or support structure for all other components of the template 10. A suction chamber 22 is defined on the back side of the plate 20 (FIG. 4) by structure that includes the flat surface of the plate itself and a specially arranged sealing rib or bead 24 constructed of flexible, non-porous resilient material. As shown best in FIG. 4, the sealing bead 24 is arranged in part in a rectangular pattern presenting a border around the back side of the plate 20, such border portion consisting of a pair of upright, parallel bead portions 24a and 24b, and a pair of horizontal, parallel, top and bottom bead portions 24c and 24d that span between the upright portions 24a, 24b. Additionally, the sealing bead 24 has more centrally disposed, interior portions including a top stretch 24e spaced a short distance below upper portion 24c, a pair of upright, parallel stretches 24f and 24g depending downwardly from top stretch 24e and spaced inwardly from respectively portions 24a and 24b, inturned short stretches 24h and 24i projecting inwardly from the lower ends of the stretches 24f and 24g, and another pair of upright, parallel stretches 24j and 24k depending downwardly from the inner ends of the horizontal stretches 24h, 24i and joining with the lower portion 24d. The last mentioned upright stretches 24j and 24k are spaced apart horizontally a distance less than the horizontal spacing between the upper upright stretches 24f and 24g.

As a result of arranging the sealing bead 24 in this manner, the suction chamber 22 is limited to a marginally outer portion of the plate surface, pneumatically isolated from and generally encircling the more centrally disposed area of the plate. It will also be noted that the suction chamber 22 is open along one entire face thereof, but that such open face will become closed by the wall or other flat surface against which the template is placed during use.

As illustrated in FIG. 4, the plate 20 has a port 26 therethrough in one of its lower corners for communicating the suction chamber 22 with the front side of the plate (see also FIG. 9). The port 26, in turn, communicates with a horizontally disposed manifold 28 on the front side of the plate 20, such manifold 28 having an internal manifold chamber 30 that extends across the front of the plate 20. The port 26 is controlled by a valve plug 32 (FIG. 9) which can be adjustably moved toward and away from the port 26 via a stem 34 which is axially slidably carried by the front wall of the manifold 28. A gripping knob 36 is provided at the outer end of the stem 34. The inner end of the valve plug 32 is beveled so as to match a corresponding chamfer on the proximal edge of the port 26, the position of the valve plug 32 relative to the port 26 determining the degree of vacuum pressure drawn on the suction chamber 22 through the manifold 28.

At the opposite end of the manifold 28 there is provided a nipple 38 communicating with the manifold chamber 30 and coupled with the vacuum hose 16 that leads to the source of vacuum 12. Intermediate the knob 36 and the nipple 38 is another control knob 40 having a stem 42 slidably projecting into and carried by the front face of the manifold 28. As illustrated in FIG. 8, the stem 42 is connected to a valve plug 44 for controlling the amount of air passing through a circular port 46 in and through the plate 20 at the center of the latter. As shown in FIG. 4, the port 46 does not open into or communicate with the suction chamber 22, but instead is in registration with the generally T-shaped central region on the backside of the plate 20 bounded by seal bead stretches 24e–24k and bottom portion 24d. Thus, although vacuum pressure is communicated to the backside of the plate 20 via the port 46, it is not communicated to the suction chamber 22 from port 46. Instead, the vacuum through port 46 is used in connection with the dust removal function of the template as will be explained below.

The plate 20 is provided with a centrally disposed rectangular window broadly denoted by the numeral 48 that provides access to the wall surface by the cutting tool 14 during use of the template 10. Axially aligned with the window 48 but behind the latter is an opening 50 corresponding at least in part to the shape of the hole to be cut. In the preferred embodiment, the opening 50 is contained within a modular component 52 (FIG. 2) which secures to the backside of the plate 20 within the region bounded by the sealing beads 24e–k. As will be appreciated, differently shaped openings 50 can be provided in different components 52 such that a number of selectively interchangeable components can be provided for use, depending upon the size and shape of the desired hole.

As illustrated in FIG. 2, the modular component 52 is generally T-shaped, having an upper rectangular head 54 and an upright, central stem 56. The opening 50 is defined within the head 54 by a cutout portion of a relatively thin, flat web 58 which is recessed with respect to the front face of the component 52. An inset rim 60 around the web 58 is perforated around its periphery to define a plurality of dust inlets 62. The inlets 62 communicate with the interior of the component 52 which is hollow; thus, the inlets 62 and the head 54 are in direct communication with a circular aperture 64 in the lower front face of the stem 56. As shown in FIG. 8, the aperture 64 is positioned to register squarely with the port 46 in the plate 20 when the component 52 is in place, thus communicating the dust inlets 62 with the vacuum pressure from vacuum source 12. A sealing bead 66 on the front face of the component 52 adjacent the outline thereof is useful in sealing the component 52 against the plate 20 when component 52 is in place within the sealing beads 24c–24k. The snug, yet releasable, fit between the bead stretches 24e–24k and the removable component 52 is sufficient to retain component 52 in proper position on the back of the plate 20.

The plate 20 is manipulated and oriented during use by a pair of gripping handles 68 and 70 on the front side of the plate. Preferably, each of the handles 68, 70 has a comfortable rubberized grip portion to promote safe and secure grasping by the worker. A pair of thumb switches 72 and 74 may be built into the handles 68 and 70 as a convenient means of controlling actuation and deactuation of the vacuum pressure from source 12. Electrical leads 76 and 78 connect respective ones of the switches 72, 74 with controls (not shown) for the vacuum source 12, it being preferred that the switch 72 be utilized for turning on the vacuum source 12 and the switch 74 be used for turning it off.

A level indicating device 80, such as a conventional bubble-type level, is secured to the front side of the plate 20 adjacent the upper extremity thereof. The opening 50 within component 52 is so disposed that when the level indicator 80 shows a level condition, the lower edge 50a of the opening 50 will be in a horizontal condition. This assures that the rectangular opening 50 will be properly squared up instead of cocked or canted in an unsightly manner.

As illustrated in FIGS. 1 and 3, the left end of the manifold 28 carries an upright locating rod 82 that can be adjustably shifted in a vertical direction through the manifold 28 when a clamping knob 84 is sufficiently loosened. When the stem 86 associated with clamping knob 84 is threaded into the manifold 28 it bears against the rod 82 and releasably secures the latter in a selected position of vertical adjustment. As will be explained in further detail below, the rod 82 is useful in locating a second or other additional hole at the appropriate distance above the floor of the room space once a first hole has been prepared.

Operation

In using the template 10 to prepare a hole in a flat surface such as the wall 88 shown in FIGS. 1 and 3, the worker first takes a measurement from the floor 90 up along the wall 88 for a predetermined distance and places a small mark on the wall 88 at the appropriate height. Then grasping the handles 68 and 70 with both hands, he places the template 10 against the wall 88 in such a manner that the bottom edge 50a of the opening 50 comes into registration with the mark. By observing the level indicating device 80, he then cocks or rotates the template 10 to the extent necessary to bring the edge 50a into a horizontal condition.

With the template 10 pressed up against the wall 88, the sealing bead 24 makes sealing contact with the surface of the wall 88. Hence, the otherwise open rear face of the suction chamber 22 becomes closed by the wall itself and a vacuum becomes drawn on the chamber 22 as soon as the vacuum source 12 is actuated.

Thus, once the template 10 is properly aligned, the worker depresses the "on" switch 72 with the thumb of his left hand, which immediately communicates the suction chamber 22 with the source of vacuum pressure 12, causing the template 10 to adhere itself to the wall 88. At the same time, the vacuum source 12 draws in air through the dust inlets 62 surrounding the opening 50. However, such inflow of ambient air does not interfere with the vacuum created within the suction chamber 22 since chamber 22 is pneumatically isolated from the opening 50 by the seal bead stretches 24e–24k. If necessary, the amount of suction at the chamber 22 and the dust inlets 62 can be adjusted or balanced by appropriate manipulation of the adjusting knobs 36 and 40 to feather the respective ports 26 and 46.

Once the template 10 has adhered itself to the wall 88, the worker can then completely remove his hands from the device and grasp the power cutter 14. After punching a hole in the wall 88 with the bit 18 of the cutter 14, the worker then manipulates the cutter 14 in such a manner that the bit 18 follows along the rectangular outline of the opening 50 until a complete hole has been cut. It will be noted in this respect that the opening 50 selected for purposes of illustration corresponds to a hole for a two-gang outlet box in which two essentially identical rectangular boxes are secured together to present, in effect, one large outlet box. However, the opening 50 can be significantly smaller than illustrated so as to correspond to only a single box, for example, or the worker can simply use the larger two-gang opening and then make his final cut for a smaller box without the aid of an edge of the opening if he so desires.

It will be noted that due to the close proximity of the dust inlets 62, the dust and residue particles in the vicinity of the opening 50 are immediately and simultaneously removed from the area as the cutting takes place. Consequently, although the worker may elect to use a small paint brush or other dust brush around the hole when finished so as to remove any loose particles in that area, there is no other clean up necessary inasmuch as all of the residue is handled by the dust inlets 62. Consequently, once the hole has been completely formed, the operator can simply turn off the power cutter 14 and lay it to one side, grip the template 10 by its handles 68 and 70, and then depress the off thumb switch 74 to deactuate the vacuum pressure. This turns off the dust inlets 62 and terminates the suction pressure to the chamber 22, allowing the template 10 to be detached from the wall 88.

Once the first hole has been made, additional holes can be prepared at the same height without remeasuring and marking the wall by simply taking advantage of the adjustable locating rod 82 (which is fairly short in the illustrated embodiment and is most advantageously used in connection with outlet boxes near floor level). By adjusting the rod 82 such that its lower tip engages the floor while the template 10 is still at the location for the first hole, the common height above the floor for all subsequent holes will be established. Consequently, on any of the next successive holes, it is only necessary to engage the rod 82 with the floor while selecting the desired horizontal position of the template 10, thus assuring that the appropriate height is established. The vacuum is then turned on and the hole is cut in the manner previously described.

It will be noted that the template 10 can also be used to prepare holes in the ceiling for receiving recessed light fixtures and the like. Once the vacuum pressure to suction chamber 22 is established, the template 10 will securely adhere itself to the ceiling in the selected location, leaving the worker free to carry out the cutting procedure at a hands-free manner. The instantaneous residue cleanup feature of the template 10 is particularly beneficial under these circumstances where the particles which would otherwise fall into the worker's eyes and on his clothing are instead immediately sucked into the system through the inlet openings 62.

It will also be noted that any number of different shapes and sizes of holes can be accommodated by virtue of the removable nature of the module component 52. By keeping a number of such components on hand, each with a distinctively different opening, the worker can simply select the opening necessary for the job at hand and install the selected component 52 in place on the backside of the plate 20.

Alternative Embodiment

FIGS. 10–13 illustrate a second embodiment of the vacuum template of the present invention in which the interchangeable module components are installed on the front side of the template, rather than the rear face thereof as in the embodiment of FIGS. 1–9. In other respects, the second embodiment is similar to the first.

The template 110 of FIGS. 10–13 has a plate 120 provided with a suction chamber 122 on its backside defined by a sealing bead 124. Instead of the generally T-shaped component 52 of the first embodiment, the template 110 contemplates a rectangular removable component 152 as shown in FIG. 13. Such component 152 is designed to attach to the front face of the plate 120 as shown in FIGS. 10 and 11, at which time a rectangular lip 152a of the component 152 bears up against the flat face of the plate 120. Four pegs 152b on the lip 152a are received within matching holes 120a in the front face of the plate 120. A reduced dimension, annular boss 152c on the rear of the lip 152a is matingly received within the rectangular window 148 in the plate 120 so as to position the opening 150 defined by the boss 152c back near the surface of the wall 88 when the template 110 is in use as illustrated in FIG. 11. A dust inlet slit 162 completely around the inside perimeter of the boss 152c adjacent its rear extremity takes the place of the series of separate dust inlets 62 of the first embodiment. At least two separate ports 192 around the outside of the boss 152c in respective sidewalls thereof are disposed to selectively communicate the hollow interior of the boss 152c with an aperture 154 at the bottom of the window 148 in the plate 120, depending upon the rotative position of component 152 when installed. The aperture 194 is located at the top end of an upright, tubular member 196 securely affixed to the backside of the plate 120 and taking the place of the tubular stem 56 associated with the first embodiment. The tubular member 196 has an aperture 164 at its lower end which registers permanently with a port 146 in the plate 120 corresponding to the port 46 in the plate 20. It is contemplated that the opening 150 within the boss 152c may need to be rotated 90 degrees from its illustrated position under certain circumstances so as to correspondingly rotatively reposition the hole being cut. This is permitted by virtue of the fact that the component 152 can be removed from the plate 120 and rotated 90 degrees so as to bring one of the other ports 192 into registration with the main aperture 194 at the bottom of the window 148.

Use of the template 110 is virtually the same as the template 10, except it will be noted in FIG. 11 that the component 152 is provided with a shoulder or shelf 198 against which the cutter 14 may rest as the bit 18 is passing through the wall 88 and carrying out the cutting action. Hands-free attachment of the template 110 to the wall 88 via suction pressure is the same as in the first embodiment, as is simultaneous and immediate vacuum cleanup of the dust and residue particles created as the cutting action is carried out.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

I claim:

1. A template for use in cutting a hole in a flat surface, said template comprising:

a portable frame adapted to be selectively placed against a flat surface in which a hole is to be cut;

means defining an opening in the frame having an outline that corresponds at least in part to the outline of the hole to be cut;

means for releasably securing the frame in a temporarily immobilized condition against the flat surface whereby to permit a hole to be cut in the surface using the outline of the opening as a guide, said releasable securing means including suction structure on the frame disposed to secure the frame to the surface by negative air pressure; and a dust inlet adjacent the opening in the frame and adapted to be coupled with a source of negative pressure for removing dust in the vicinity of the hole as the surface is being cut.

2. A template as claimed in claim 1, said frame including a transparent plate to facilitate visual orientation of the template during use..

3. A template as claimed in claim 1, said frame having adjustable probe means operably associated therewith for gauging the distance of the template from adjacent structure during use.

4. A template as claimed in claim 1; and level indicating means carried by the frame for use in establishing a level condition for a portion of the outline of the opening.

5. A template as claimed in claim 1, said opening defining means including at least of pair of alternately selectable components interchangeably attachable to said frame and each having a particularly configured opening therein.

6. A template for use in cutting a hole in a flat surface, said template comprising:

a portable frame adapted to be selectively placed against a flat surface in which a hole is to be cut;

means defining an opening in the frame having an outline that corresponds at least in part to the outline of the hole to be cut;

means for releasably securing the frame in a temporarily immobilized condition against the flat surface whereby to permit a hole to be cut in the surface using the outline of the opening as a guide; and a dust inlet adjacent the opening in the frame and adapted to be coupled with a source of negative pressure for removing dust in the vicinity of the hole as the surface is being cut.

7. A template as claimed in claim 6, said frame including a plate having said opening therein, said plate having flexible sealing elements on one side thereof arranged generally around the opening to define an open-faced suction chamber that becomes closed by the flat surface when the sealing elements are pressed against the surface during use of the template, said suction chamber being adapted for connection with a source of negative pressure for use in attaching the frame to the surface.

8. A template as claimed in claim 6, said opening defining means including at least of pair of alternately selectable components interchangeably attachable to said frame and each having a particularly configured opening therein.

9. A template as claimed in claim 6, said frame including a transparent plate to facilitate visual orientation of the template during use.

10. A template as claimed in claim 6, said frame having adjustable probe means operably associated therewith for gauging the distance of the template from adjacent structure during use.

11. A template as claimed in claim 6, level indicating means carried by the frame for use in establishing a level condition for a portion of the outline of the opening.

12. A template for use in cutting a hole in a flat surface, said template comprising:

a portable frame adapted to be selectively placed against a flat surface in which a hole is to be cut;

means defining an opening in the frame having an outline that corresponds at least in part to the outline of the hole to be cut; and means for releasably securing the frame in a temporarily immobilized condition against the flat surface whereby to permit a hole to be cut in the surface using the outline of the opening as a guide, said frame including a plate having said opening therein, said plate having flexible sealing elements on one side thereof arranged generally around the opening to define an open-faced suction chamber that becomes closed by the flat surface when the sealing elements are pressed against the surface during use of the template, said suction chamber being adapted for connection with a source of negative pressure for use in attaching the frame to the surface, said plate having a manifold on the opposite side thereof, said manifold having a first port communicating with said suction chamber and a second port communicating with a dust inlet adjacent said opening in the plate, said manifold being provided with means for coupling the manifold with a source of negative pressure.

13. A template as claimed in claim 12, each of said ports having an adjustable valve for controlling the amount of suction at the suction chamber and the dust inlet.

14. A template as claimed in claim 12, said opening defining means including at least of pair of alternately selectable components interchangeable attachable to said frame and each having a particularly configured opening therein.

15. A template as claimed in claim 12, said frame including a transparent plate to facilitate visual orientation of the template during use.

16. A template as claimed in claim 12, said frame having adjustable probe means operably associated therewith for gauging the distance of the template from adjacent structure during use.

17. A template as claimed in claim 12, level indicating means carried by the frame for use in establishing a level condition for a portion of the outline of the opening.

18. A template for use in cutting a hole in a flat surface, said template comprising:

a portable frame adapted to be selectively placed against a flat surface in which a hole is to be cut;

means defining an opening in the frame having an outline that corresponds at least in part to the outline of the hole to be cut, said opening defining means including at least a pair of alternately selectable components interchangeably attachable to said frame and each having a particularly configured opening therein for receiving a cutting tool during cutting of the hole in the flat surface; and means for releasably securing the frame in a temporarily immobilized condition against the flat surface whereby to permit a hole to be cut in the surface using the outline of the opening as a guide, said releasable securing means including suction structure on the frame disposed to secure the frame to the surface by negative air pressure.

19. A template as claimed in claim 18, each of said components having a dust inlet therein which is disposed for communication with a source of negative air pressure when the component is attached to the frame for removing dust from the vicinity of the hole as it is being cut.

20. A template as claimed in claim 18, said frame having sealing elements on a side of the frame facing the surface during use in disposition for sealing engagement with said surface, said sealing elements being configured and arranged generally around the opening in the removable component when the latter is attached to the frame for creating a sealed space around the opening to facilitate the removal of dust when cutting.

21. A template as claimed in claim 20, said component being attached to the frame on said side facing the surface during use.

22. A template as claimed in claim 20, said component being attached to the frame on an opposite side facing away from the surface during use.

23. A template as claimed in claim 22, said frame including a plate having a window therein, said component including an annular boss portion configured to be matingly received within said window, said component further including an enlarged lip portion secured to and projecting laterally outwardly from said boss portion for abutting engagement with the plate when the component is attached thereto, said lip portion having means associated therewith for removably securing the component to the plate.

24. A template as claimed in claim 23, said component having guide surfaces thereon for controlling the position of a cutting tool during cutting of the hole in the flat surface.

25. A template for use in cutting a hole in a flat surface, said template comprising:

a portable frame adapted to be selectively placed against a flat surface in which a hole is to be cut;

means defining an opening in the frame having an outline that corresponds at least in part to the outline of the hole to be cut; and means for releasably securing the frame in a temporarily immobilized condition against the flat surface whereby to permit a hole to be cut in the surface using the outline of the opening as a guide, said opening defining means including at least a pair of alternately selectable components interchangeably attachable to said frame and each having a particularly configured opening therein, each of said components having a dust inlet therein which is disposed for communication with a source of negative air pressure when the component is attached to the frame for removing dust from the vicinity of the hole as it is being cut.

26. A template for use in cutting a hole in a flat surface, said template comprising:

a portable frame adapted to be selectively placed against a flat surface in which a hole is to be cut;

means defining an opening in the frame having an outline that corresponds at least in part to the outline of the hole to be cut; and means for releasably securing the frame in a temporarily immobilized condition against the flat surface whereby to permit a hole to be cut in the surface using the outline of the opening as a guide, said opening defining means including at least a pair of alternately selectable components interchangeably attachable to said frame and each having a particularly configured opening therein, said frame having sealing elements on a side of the frame facing the surface during use in disposition for sealing engagement with said surface, said sealing elements being configured and arranged generally around the opening in the removable component when the latter is attached to the frame for creating a sealed space around the opening to facilitate the removal of dust when cutting.

27. A template as claimed in claim 26, said component being attached to the frame on said side facing the surface during use.

28. A template as claimed in claim 26, said component being attached to the frame on an opposite side facing away from the surface during use.

29. A template as claimed in claim 28, said frame including a plate having a window therein, said component including an annular boss portion configured to be matingly received within said window, said component further including an enlarged lip portion secured to and projecting laterally outwardly from said boss portion for abutting engagement with the plate when the component is attached thereto, said lip portion having means associated therewith for removably securing the component to the plate.

30. A template as claimed in claim 29, said component having guide surfaces thereon for controlling the position of a cutting tool during cutting of the hole in the flat surface.

31. A template for use in cutting a hole in a flat surface, said template comprising:

a portable frame adapted to be selectively placed against a flat surface in which a hole is to be cut;

means defining an opening in the frame having an outline that corresponds at least in part to the outline of the hole to be cut; and means for releasably securing the frame in a temporarily immobilized condition against the flat surface whereby to permit a hole to be cut in the surface using the outline of the opening as a guide, said frame including a pair of spaced apart gripping handles disposed to facilitate attachment of the template to the surface, said frame having selectively actuatable, vacuum powered dust removal means associated therewith, at least one of said handles having control means associated therewith for selectively actuating said dust removal means.

32. A method of installing an article in a hole cut in a flat surface comprising the steps of:

providing a template having an opening which has an outline corresponding at least in part to the outline of the hole to be cut in the flat surface;

temporarily attaching the template to the flat surface at a location spaced outwardly from the hole, said attaching step including the, step of using suction pressure to attach the template to the flat surface;

cutting the hole in the surface using the outline of the opening as a guide;

simultaneously removing dust from the vicinity of the hole by vacuum pressure as the hole is being cut;

removing the template from the flat surface; and inserting the article into the hole.

33. A template as claimed in claim 32; and the additional step of using a single source of negative pressure for said suction and vacuum pressures.

* * * * *